United States Patent [19]

Anami

[11] 4,325,444
[45] Apr. 20, 1982

[54] PROTECTOR FOR A DIFFERENTIAL GEAR CASING OF A VEHICLE

[75] Inventor: Yuichi Anami, Kawasaki, Japan

[73] Assignee: Kabushiki Kaisha Komatsu Seisakusho, Tokyo, Japan

[21] Appl. No.: 162,439

[22] Filed: Jun. 24, 1980

[51] Int. Cl.³ .............................................. B60K 17/00
[52] U.S. Cl. .................................. 180/70 R; 293/118; 293/123; 293/132; 298/1 R
[58] Field of Search ........................ 180/70, 71, 73 R; 298/1 R, 1 SG; 280/762, 770; 293/1 R, 123, 141, DIG. 1, 118, 132

[56] References Cited

U.S. PATENT DOCUMENTS 3,211,498 10/1965 Peller ................................ 180/70 R
3,806,196 4/1974 Cole et al. ......................... 298/1 SG
4,097,090 6/1978 Payne et al. ...................... 298/1 SG Primary Examiner—Robert R. Song
Attorney, Agent, or Firm—Armstrong, Nikaido, Marmelstein & Kubovcik

[57] ABSTRACT

A protector for a differential gear casing of a vehicle including a pair of suspension cylinders for the differential gear casing, the protector being pivotally mounted at its upper end to a frame of the vehicle in such a way that it is pivotable about a horizontal axis at right angles with the advancing direction of the vehicle, the protector having mounted thereon a cushion pad which is urged to contact with the differential gear casing by a pair of springs provided between the lower end of the protector and the differential gear casing.

2 Claims, 4 Drawing Figures

PROTECTOR FOR A DIFFERENTIAL GEAR CASING OF A VEHICLE

BACKGROUND OF THE INVENTION

This invention relates to a protector for a differential gear casing of a wheel-type vehicle such as dump truck or the like.

A rear-drive wheel-type vehicle such as dump truck is generally provided with a differential gear covered with a casing therefor. Since such a conventional dump truck is not equipped with a protector for a differential gear casing, the differential gear casing and parts adjacent thereto are often damaged or deformed by rocks falling thereto during loading operations.

SUMMARY OF THE INVENTION

It is therefore an object of the present invention to provide a protector for a differential gear casing of a wheel-type vehicle, which is capable of preventing the differential gear casing and parts adjacent thereto from being damaged by falling rocks.

In accordance with an aspect of the present invention, there is provided a protector for a differential gear casing of a vehicle, comprising: a frame of the vehicle; a pair of suspension cylinder means for suspending said differential gear casing, one end of each of said suspension cylinder means being pivotally mounted to said frame and the other end of which is coupled to said differential gear casing; protector means pivotally mounted at its upper end to said frame, said protector means being pivotable about a horizontal axis at right angles with the advancing direction of the vehicle; first cushion means mounted on said protector means; and spring means provided between the lower end of said protector means and said differential gear casing for biasing said protector means toward said differential gear casing and thereby contacting said first cushion means with said differential gear casing.

The above and other objects, features and advantages of the present invention will be readily apparent from the following description taken in conjunction with the accompanying drawings.

DESCRIPTION OF THE PREFERRED EMBODIMENT

The present invention will now be described in detail with reference to the accompanying drawings.

Figure 1:
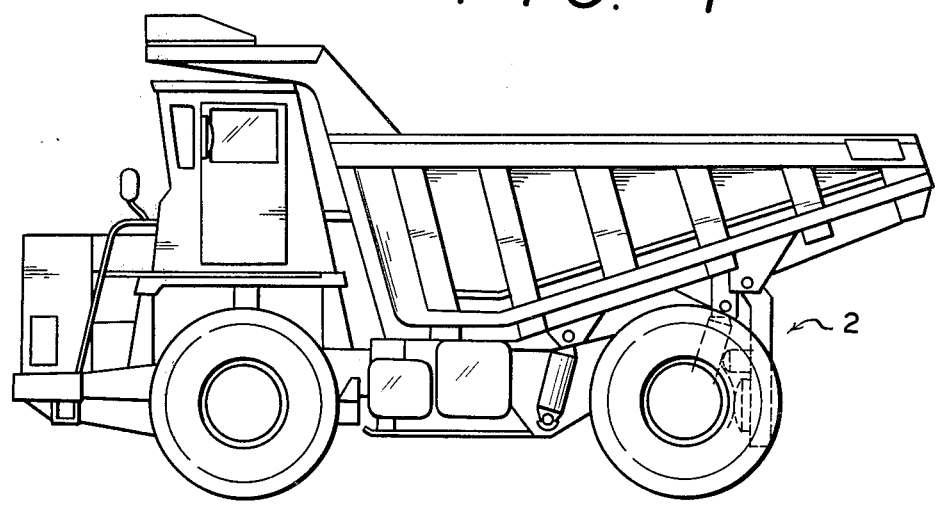
FIG. 1 is a side elevation of a dump truck equipped with a protector for a differential gear casing according to the present invention.
Figure 2:
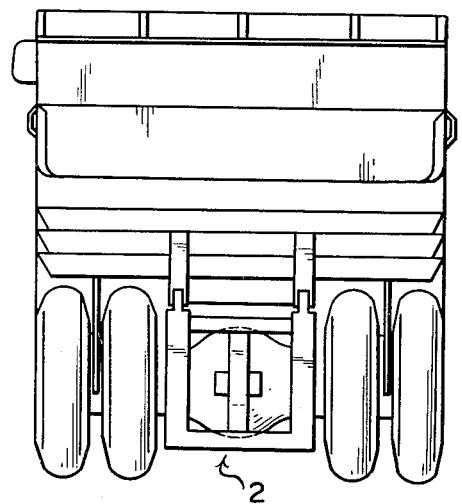
FIG. 2 is a rear elevation of the dump truck shown in FIG. 1.
Figure 3:
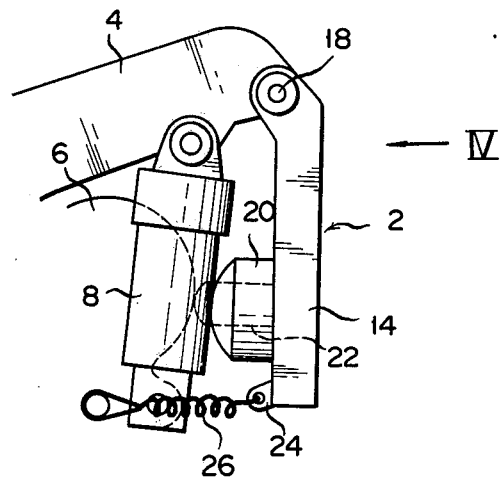
FIG. 3 is a schematic side elevation of a protector according to the present invention.
Figure 4:
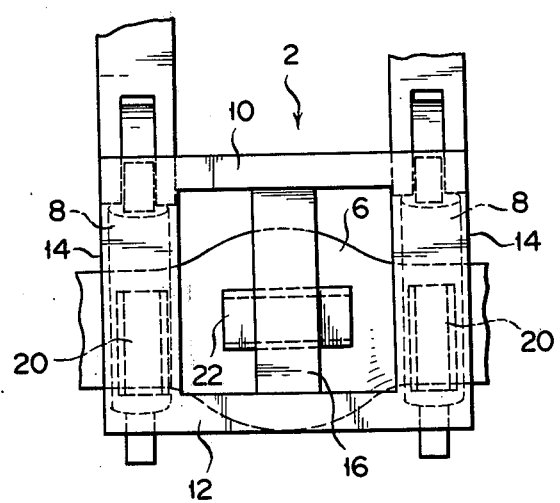
FIG. 4 is a rear elevation of the protector as seen from an arrow IV in FIG. 3.

Referring to FIGS. 1 and 2, a protector of the invention is generally designated by reference numeral 2 and is pivotally mounted at its top end to a frame 4 of a dump truck. As will be seen from FIGS. 3 and 4, a differential gear casing 6 is suspended by a pair of suspension cylinders 8 and 8. Each suspension cylinder 8 is pivotally mounted at its top end to the frame 4 and a lower end portion of which is coupled with the differential gear casing 6.

The protector 2 comprises upper and lower frames 10 and 12, side frames 14 and 14 and an intermediate frame 16 interconnecting the upper and lower frames 10 and 12.

Each side frame 14 is pivotally mounted at its top end to the frame 4 of the vehicle by a pin 18 extending horizontally at right angles with the advancing direction of the vehicle, thus allowing the protector 2 to be pivoted forwardly and backwardly relative to the vehicle.

Cushion pads such as rubber pads 20, 20 are mounted on the inner surfaces of the respective side frames 14 and 14, and a similar cushion pad 22 is mounted on the inner surface of the intermediate frame 16. Each side frame 14 of the protector has a bracket 24 formed thereon at the lower end thereof.

A pair of springs 26 and 26 are provided for biasing the respective side frames 14 and 14 toward the differential gear casing 6. Each spring 26 has its one end connected to the bracket 24 and the other end connected to the differential gear casing 6. With these arrangements, therefore, the cushion pads 20 and 22 are urged to contact with the suspension cylinders 8 and the differential gear casing 6, respectively.

Since the lower ends of each side frame 14 of the protector 2 are biased toward the differential gear casing 6, the protector is not allowed to swing freely when the vehicle is running.

As described in greater detail above, a differential gear casing of a dump truck equipped with a protector of the present invention is protected from falling rocks during loading operations and is thereby prevented from being damaged or deformed.

It is to be understood that the foregoing description is merely illustrative of a preferred embodiment of the present invention, and that the scope of the invention is not to be limited thereto, but is to be determined by the appended claims.

What I claim is:

1. A protector for a differential gear casing of a vehicle, comprising:
    a frame of the vehicle;
    a pair of suspension cylinder means for suspending said differential gear casing, one end of each of said suspension cylinder means being pivotally mounted to said frame and the other end of which is coupled to said differential gear casing;
    protector means pivotally mounted at its upper end to said frame, said protector means being pivotable about a horizontal axis at right angles with the advancing direction of the vehicle;
    first cushion means mounted on said protector means; and
    spring means provided between the lower end of said protector means and said differential gear casing for biasing said protector means toward said differential gear casing and thereby contacting said first cushion means with said differential gear casing.

2. A protector for a differential gear casing as recited in claim 1 further comprising a pair of second cushion means each being adapted to contact with said respective suspension cylinder means.

* * * * *